US011318786B2

(12) United States Patent
Bergman

(10) Patent No.: US 11,318,786 B2
(45) Date of Patent: May 3, 2022

(54) CASTER WHEEL ASSEMBLY AND A WHEELCHAIR COMPRISING THE SAME

(71) Applicant: PERMOBIL AB, Timrå (SE)

(72) Inventor: Håkan Bergman, Timrå (SE)

(73) Assignee: PERMOBIL AB (*) Notice: Subject to any disclaimer, the term of this patent is extended or adjusted under 35 U.S.C. 154(b) by 0 days.

(21) Appl. No.: 16/349,696

(22) PCT Filed: Dec. 7, 2017

(86) PCT No.: PCT/EP2017/081843
§ 371 (c)(1),
(2) Date: May 14, 2019

(87) PCT Pub. No.: WO2018/104461
PCT Pub. Date: Jun. 14, 2018

(65) Prior Publication Data
US 2019/0366768 A1 Dec. 5, 2019

(30) Foreign Application Priority Data
Dec. 9, 2016 (EP) .................................... 16203158

(51) Int. Cl.
B60B 33/04 (2006.01)
B60B 33/00 (2006.01)
A61G 5/04 (2013.01)

(52) U.S. Cl.
CPC ...... B60B 33/0071 (2013.01); B60B 33/0057 (2013.01); B60B 33/04 (2013.01);
(Continued)

(58) Field of Classification Search
CPC ... B60B 33/06; B60B 33/006; B60B 33/0065; B60B 33/04; B60B 33/0071;
(Continued)

(56) References Cited

U.S. PATENT DOCUMENTS 1,386,317 A * 8/1921 Claassen ................. B60B 33/04
16/19
1,861,919 A * 6/1932 Hill ....................... B60B 33/045
16/34
(Continued)

FOREIGN PATENT DOCUMENTS

CN 1576063 A 2/2005
CN 101535057 A 9/2009
(Continued)

OTHER PUBLICATIONS

Machine tralsation of JP 5217016.*
(Continued)

Primary Examiner — Emily M Morgan
(74) Attorney, Agent, or Firm — McAndrews, Held & Malloy, Ltd.

(57) ABSTRACT

The present disclosure relates to a caster wheel assembly (1), comprising: a caster housing (3) provided with an axial channel, a spindle shaft (7) configured to be received by the channel of the caster housing (3), which spindle shaft (7) is inclined relative to the vertical plane when mounted in the caster housing (3) and the caster wheel assembly (1) is in use resting on a horizontal support, the caster housing (3) and the spindle shaft (7) being configured to rotate freely relative to each other, a caster wheel fork (9) having a wheel axle (11) configured to be arranged offset relative to a central axis of the spindle shaft (7), to provide a trail functionality, and a height adjustment mechanism (6) configured to adjust an axial position of the spindle shaft (7) relative to the caster housing (3) based on a rotational position of the spindle shaft (7) in relation to the caster housing (3).

13 Claims, 4 Drawing Sheets

(52) U.S. Cl.
CPC .......... *A61G 5/043* (2013.01); *B60B 2200/26* (2013.01); *B60B 2900/114* (2013.01)

(58) Field of Classification Search
CPC ... B60B 33/0076; B60B 33/063; B60B 33/00; B60B 33/043
See application file for complete search history.

(56) References Cited

U.S. PATENT DOCUMENTS

| | | | | |
|---|---|---|---|---|
| 2,139,503 | A * | 12/1938 | Jordan | A47L 5/34 16/19 |
| 2,524,819 | A * | 10/1950 | McKean | B60B 33/06 16/32 |
| 2,560,562 | A * | 7/1951 | Ferwerda | B62D 7/02 16/18 R |
| 4,596,232 | A * | 6/1986 | Dowding | F24B 1/1806 126/500 |
| 5,347,680 | A * | 9/1994 | Rippe | B60B 33/0042 16/18 R |
| 6,568,030 | B1 * | 5/2003 | Watanabe | B60B 33/045 16/44 |
| 10,092,465 | B2 * | 10/2018 | Van de Wal | B60B 33/00 |
| 2006/0087098 | A1 * | 4/2006 | Peterson | B60B 33/0007 280/304.1 |
| 2007/0209848 | A1 * | 9/2007 | Tang | A61G 5/06 180/65.1 |
| 2011/0156365 | A1 * | 6/2011 | Chiu | B60B 33/04 280/43.24 |
| 2011/0232028 | A1 * | 9/2011 | Lee | B60B 33/0039 16/45 |
| 2014/0312588 | A1 * | 10/2014 | Davis | B60B 33/0049 280/87.041 |
| 2020/0047552 | A1 * | 2/2020 | Fawcett | B60B 33/0071 |

FOREIGN PATENT DOCUMENTS

| | | | | |
|---|---|---|---|---|
| DE | 202017004094 U1 * | 9/2017 | ........... | B60B 33/028 |
| EP | 3332986 A1 * | 6/2018 | ......... | B60B 33/0057 |
| GB | 2187687 A * | 9/1987 | ......... | B60B 33/0042 |
| JP | 2010030573 A * | 2/2010 | ......... | B60B 33/0071 |
| JP | 2010030573 A | 2/2010 | | |
| JP | 5217016 B2 * | 6/2013 | ......... | B60B 33/0071 |
| WO | 94/08801 A1 | 4/1994 | | |
| WO | WO-9408801 A1 * | 4/1994 | ......... | B60B 33/0052 |
| WO | 03/101364 A1 | 12/2003 | | |

OTHER PUBLICATIONS

PCT International Search Report and Written Opinion for PCT Patent Application No. PCT/EP2017/081843 dated May 7, 2018. 11 Pages.

Office Action for Chinese Patent Application No. 201780071833.9 dated Nov. 24, 2021, 15 pages.

* cited by examiner

CASTER WHEEL ASSEMBLY AND A WHEELCHAIR COMPRISING THE SAME

CROSS-REFERENCE TO RELATED APPLICATIONS/INCORPORATION BY REFERENCE

The present application is the U.S. national phase under § 371 of International Application No. PCT/EP2017/081843, having an international filing date of Dec. 7, 2017, which claims priority to EP Patent Application No. 16203158.7, filed Dec. 9, 2016. Each of the above-mentioned prior-filed applications is hereby expressly incorporated herein by reference in its entirety.

TECHNICAL FIELD

The present disclosure generally relates to a caster wheel assembly. In particular, it relates to a caster wheel assembly which has a trail-functionality.

BACKGROUND

Wheelchairs are generally provided with a pair of non-swivelling wheels, such as drive wheels in the case of powered wheelchairs. Wheelchairs may also be provided with caster wheels, in particular swivel caster wheels facilitating rotation of the wheelchair in any direction.

Caster wheels of the type that swivel are known to flutter or to shimmy. Flutter or shimmy occurs when a caster wheel starts to oscillate side-to-side. In the case of flutter, the side-to-side oscillation is obtained by forced oscillation and in case of shimmy by self-excited oscillation. These side-to-side oscillations are highly undesirable because the direction of orientation of the caster wheel becomes uncontrollable. Further, the oscillations may give rise to vibrations in the seat which may be experienced as uncomfortable for the user. Normally oscillation occurs when the wheel is not in full contact with the ground, and the wheel may have turned in any direction when full ground contact is regained. Oscillations may also occur without the caster wheels losing contact with the ground in case the wheelchair speed is sufficiently high.

There are a number of methods of reducing flutter and shimmy. U.S. Pat. No. 4,989,920, for example, discloses a caster wheel assembly which has a trail functionality to increase the critical velocity, i.e. the velocity at which the caster wheel will begin to self-oscillate, to reduce shimmy for normal operating speeds. According to U.S. Pat. No. 4,989,920 trail is the distance with which the axle of the caster wheel is offset behind the vertical pivot of the wheel during travel.

SUMMARY

In U.S. Pat. No. 4,989,920, and in all known disclosures of trail functionality, the definition of trail provided means that the swivel axle is vertical when the caster wheel assembly is in use and rests on a horizontal support surface.

In order to reduce the footprint of a vehicle provided with a caster wheel assembly and trail functionality, it has been proposed in EP16203120.7 by the present applicant that the swivel axle, or spindle shaft, is inclined relative to the vertical plane when the caster wheel assembly is in use and rests on a horizontal support surface, to thereby provide a trail functionality with smaller footprint. In this case, swivelling of the caster wheel about the inclined spindle shaft causes a change in the vertical position of the chassis to which the caster wheel assembly is mounted.

An object of the present disclosure is to provide a caster wheel assembly which solves, or at least mitigates the problems with inclined spindle shafts.

There is hence according to a first aspect of the present disclosure provided a caster wheel assembly, comprising: a caster housing provided with an axial channel, a spindle shaft configured to be received by the channel of the caster housing, which spindle shaft is inclined relative to a vertical plane when mounted in the caster housing and the caster wheel assembly is in use resting on a horizontal support, the caster housing and the spindle shaft being configured to rotate freely relative to each other, a caster wheel fork having a wheel axle configured to be arranged offset relative to a central axis of the spindle shaft, to provide a trail functionality, and a height adjustment mechanism configured to adjust an axial position of the spindle shaft relative to the caster housing based on a rotational position of the spindle shaft in relation to the caster housing.

By means of the height adjustment mechanism, which adjusts the relative position of the spindle shaft and the caster housing depending on the relative rotational position of the spindle shaft and the caster housing, changes in the vertical position of the chassis can be avoided when a caster wheel swivels about the inclined axis defined by the spindle shaft. Hereto, a user using a wheelchair, a gurney, a cart or the like provided with the caster wheel assembly will be subjected to a more comfortable experience.

The caster wheel assembly is beneficially a caster wheel assembly for a wheelchair. Alternatively, the caster wheel assembly could for example be a caster wheel assembly for a gurney or a cart.

The caster wheel assembly may according to one embodiment comprise an arm, such as a swing arm.

According to one variation, the caster housing may be configured to be fixedly and immovably mounted to the arm, wherein the spindle shaft is configured to be arranged rotatably relative to the caster housing inside the channel of the caster housing. The caster wheel fork is in this case configured to be mounted to the spindle shaft. The spindle shaft and the caster wheel fork will thereby be able to rotate concurrently relative to the caster housing.

Alternatively, the spindle shaft may be configured to be fixedly and immovably mounted to the arm, wherein the caster housing is configured to be arranged rotatably relative to the spindle shaft. In this case, the caster wheel fork is configured to be mounted to the caster housing. The caster housing and the caster wheel fork will thereby be able to rotate concurrently relative to the spindle shaft.

The height adjustment mechanism may be provided with a first cam surface in the form of an upper cam surface, and a guide protrusion extending radially and configured to be rotatable about the central axis of the spindle shaft, relative to the upper cam surface. The guide protrusion is configured to be arranged axially below the first cam surface and configured to cooperate with the upper cam surface so that relative rotation between the upper cam surface and the guide protrusion causes an axial displacement of the spindle shaft relative to the caster housing. The spindle shaft may according to one variation be rotatable relative to the upper cam surface, and the spindle shaft may be provided with the guide protrusion. Alternatively, the spindle shaft may be provided with the first cam surface, and the caster housing may be provided with the guide protrusion.

According to one embodiment the height adjustment mechanism comprises a guide structure provided with an inclined guide surface configured to extend circumferentially around the spindle shaft, and a guide protrusion extending radially from a main body of the spindle shaft, wherein the guide protrusion and the inclined guide surface are configured to cooperate when the spindle shaft is rotated, to adjust the axial position of the spindle shaft inside the caster housing.

Any inclined surface described herein, i.e. an "inclined guide surface" or "inclined support surface", is inclined relative to a cross-sectional plane of the spindle shaft and caster housing, in an assembled state of the caster wheel assembly.

According to one embodiment the guide structure is a guide member provided with an opening configured to receive an end portion of the spindle shaft, and wherein the guide protrusion is a guide pin.

According to one embodiment the guide member is configured to be axially fixed relative to the caster housing.

According to one embodiment the guide member is configured to engage with the caster housing, to rotationally lock the guide member relative to the caster housing.

According to one embodiment the inclination of the inclined guide surface is a function of the angled orientation of a distal end portion of the caster wheel fork, comprising the wheel axle, relative to the central axis of the spindle shaft.

One embodiment comprises a support member provided with a through-opening and configured to receive the spindle shaft and having an inclined support surface configured to be arranged axially displaced from and in parallel with the inclined guide surface, the inclined support surface being configured to support the guide protrusion, the inclined guide surface and the inclined support surface forming a guide track between them, wherein the guide protrusion is configured to be arranged in the guide track, in contact with the inclined guide surface and the inclined support surface.

According to one embodiment the caster housing has an inner flange surface configured to axially support the support member to prevent axial movement of the support member.

According to one embodiment the guide protrusion is arranged fixed in relation to a main body of the spindle shaft.

One embodiment comprises a swing arm configured to be coupled to the caster housing.

According to one embodiment in a first rotational position of the spindle shaft, the guide protrusion is configured to be located at a highest point of the inclined guide surface of the guide member.

According to one embodiment in a second rotational position of the spindle shaft, at 180 degrees relative to the first rotational position, the guide protrusion is configured to be located at a lowest point of the inclined guide surface.

There is according to a second aspect of the present disclosure provided a wheelchair comprising: a chassis, and a caster wheel assembly according to the first aspect, configured to be pivotally coupled to the chassis.

According to one embodiment the wheelchair is an electrically powered wheelchair.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
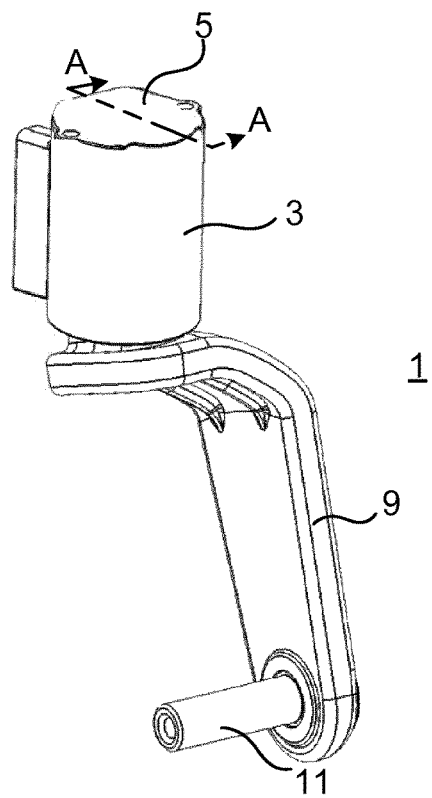
FIG. 1 schematically shows a perspective view of an example of a caster wheel assembly.

FIG. 1 shows an example of a caster wheel assembly 1 for a wheelchair. Caster wheel assembly 1 comprises a caster housing 3, a guide member 5 configured to be mounted to the caster housing 3, a spindle shaft 7 configured to be received by the caster housing 3, shown in FIG. 3, and configured to rotate relative freely inside the caster housing 3, and a caster wheel fork 9 which has a wheel axle 11 for mounting a caster wheel thereto.

The caster wheel fork 9 is configured to be fixedly connected to the spindle shaft 7 so that when the spindle shaft 7 rotates relative to the caster housing 3, the caster wheel fork 9 rotates concurrently with the spindle shaft 7.

According to the present example, the caster housing 3 is configured to be fixedly or immovably mounted to an arm, such as a swing arm, which is configured to be connected to the chassis of a wheelchair.

As an alternative to the above configuration, the spindle shaft may be configured to be fixedly or immovably mounted to the arm, such as a swing arm, which is configured to be connected to the chassis of a wheelchair. In this case, the caster housing is configured to rotate freely relative to the fixed spindle shaft, and the caster wheel fork is configured to be mounted to the caster housing so that when the caster housing rotates relative to the spindle shaft, the caster wheel fork rotates relative to the spindle shaft, concurrently with the caster housing.

Figure 2:
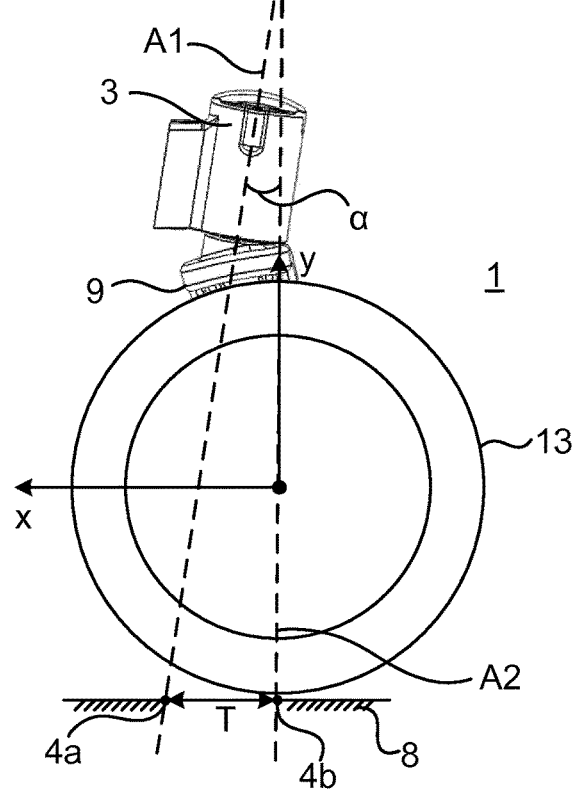
FIG. 2 shows a side view of the caster wheel assembly in FIG. 1, including a caster wheel.

FIG. 2 shows a side view of the caster wheel assembly 1, including a caster wheel 13 mounted to the caster wheel fork 9. The wheel axle 11 is configured to be arranged offset relative to a central axis A1 of the spindle shaft 7. In this manner, a trail functionality is provided. The spindle shaft 7 is configured to be arranged in an inclined manner, or tilted, relative to a vertical plane when the caster wheel assembly 1 is mounted to a chassis of a wheelchair, and placed on a horizontal support surface. In the x-y coordinate system centred at the centre point of the wheel axle 11, shown in FIG. 2, the axis A1 intersects both the y-axis and the x-axis. There is in particular an angle $\alpha$ between the y-axis and the axis A1. The positive direction of the x-axis shows the direction of movement/driving. The axis A2 extending vertically through the wheel axle 11, aligned with the y-axis, intersects the axis A1 defined by the spindle shaft 7. Hereto, the distance between axis A2 and axis A1 increases in the direction towards the ground support 8 on which the caster wheel assembly 1 is arranged in use. The distance between the two axes A1 and A2 at the point 4a where axis A1 intersects the ground support 8 and the point 4b where axis A2 intersects the ground support 8 is the trail T, which gives rise to the trail functionality. This definition is more general than the one given in the prior art, which represents the special case when the two axes shown in FIG. 2 are parallel. The trail functionality reduces the risk of shimmy for normal operating speeds.

Figure 3:
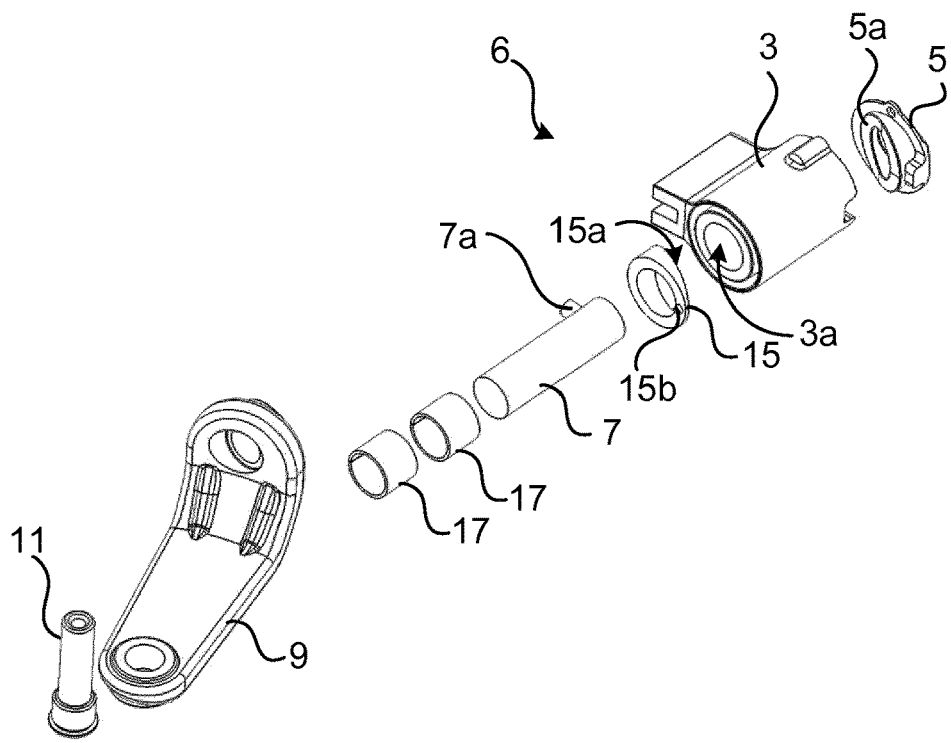
FIG. 3 shows an exploded view of the caster wheel assembly in FIG. 1.

FIG. 3 shows an exploded view of the exemplified caster wheel assembly 1. The caster wheel assembly 1 includes a height adjustment mechanism 6 configured to adjust an axial position of the spindle shaft relative to the caster housing 3, based on a rotational position of the spindle shaft 7 in relation to the caster housing 3. The height adjustment mechanism 6 comprises a guide structure which in the present embodiment will be exemplified by a guide member 5.

The caster wheel assembly 1 also includes bearings 17 configured to be mounted around the spindle shaft 17 to facilitate relative rotation between the caster housing 3 and the spindle shaft 7.

The caster housing 3 has an axial channel 3a configured to receive the spindle shaft 7.

According to the example, the spindle shaft 7 has a guide protrusion 7a extending radially from the main body of the spindle shaft 7. The guide protrusion 7a also forms part of the height adjustment mechanism 6. According to the present example, the guide protrusion 7a is a guide pin.

The guide member 5 is configured to be mounted to the caster housing 3, to thereby close the upper end of the caster housing 3. The guide member 5 has an opening configured to receive an end potion of the spindle shaft 7 and an inclined guide surface 5a extending circumferentially around the opening. The inclined guide surface 5a is inclined relative to a cross-sectional plane of the caster housing 3. The inclined guide surface 5a defines the first cam surface.

The caster wheel assembly 1 may also comprise a support member 15 provided with a through-opening and configured to be received by the caster housing 3. The caster housing 3 is configured to receive the support member 15 in the axial channel 3a. The support member 15 has an inclined support surface 15a extending circumferentially around the through-opening and configured to support the guide protrusion 7a. The inclined support surface 15a is configured to be arranged axially displaced from and parallel with the inclined guide surface 5a of the guide member 5. The inclined support surface 15a defines a second cam surface.

The spindle shaft 7 is configured to be arranged in the caster housing 3 such that the guide protrusion 7a is arranged in a guide track formed between the inclined guide surface 5a and the inclined support surface 15a. The guide protrusion 7a is configured to cooperate with the inclined guide surface 5a and the inclined support surface 15a. The support member 15, and in particular the inclined support surface 15a ensures that the spindle shaft 7 is maintained within the caster housing 3.

The guide member 5 and the support member 15 are configured to be arranged axially and rotationally fixed relative to the caster housing 3. Rotation of the spindle shaft 7 will thereby cause the guide protrusion 7a to move along the first and the second cam surfaces, and this rotation is translated into linear displacement of the spindle shaft 7 relative to the caster housing 3, as will be explained in more detail in the following.

Figure 4:
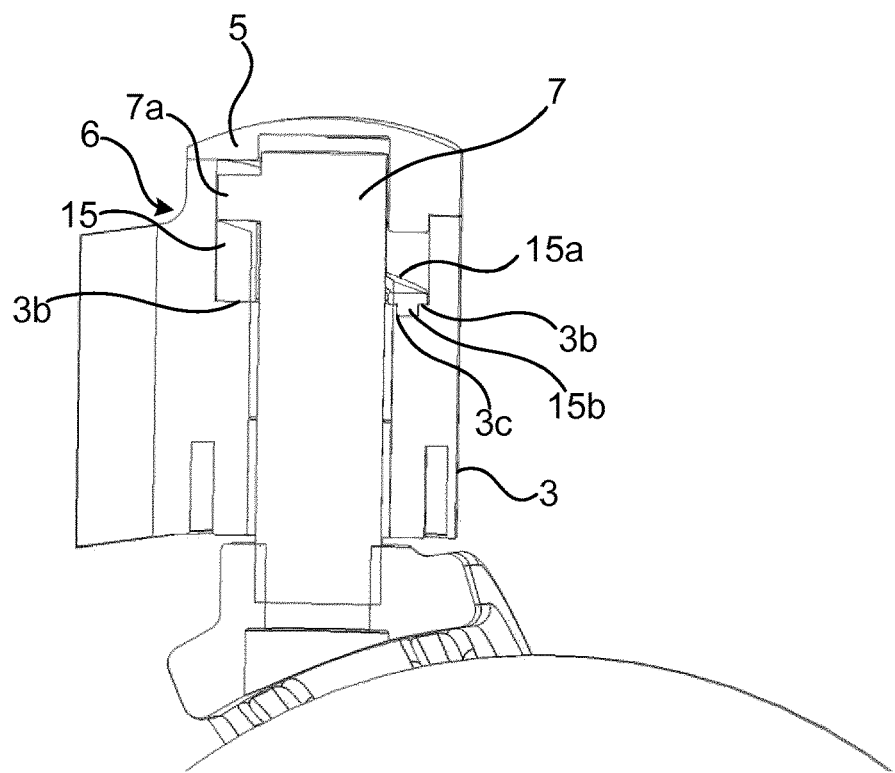
FIG. 4 shows a longitudinal section along lines A-A of the caster wheel assembly in FIG. 1.

Turning now to FIG. 4, a longitudinal section of the caster wheel assembly 1 along section line A-A is shown. According to the example shown in FIG. 4 the caster housing 3 has an inner flange surface, or an inner ledge, 3b. The inner flange surface 3b is configured to axially support the support member 15.

As noted above, the guide member 5 is configured to be rotationally fixed relative to the caster housing 3. The guide member 15 is according to the example configured to engage with the caster housing 3, for example by means of one or more fasteners such as screws or bolts. Moreover, according to the present example, the support member 15 has an axially extending protrusion 15b and the inner flange surface 3b is provided with a recess 3c extending in the axial direction and configured to receive the axially extending protrusion 15 of the support member 15. The axially extending protrusion 15b and the recess 3c are designed such that relative rotation between the support member 15 and the caster housing 3 is prevented.

In the mounted state shown in FIG. 4, the spindle shaft 7 and the support member 15 are arranged in the caster housing 3, and the caster wheel fork 9 is mounted to the spindle shaft 7. Furthermore, the guide member 5 is mounted to the caster housing 3. The guide protrusion 7a of the spindle shaft 7 extends radially in between the first cam surface and the second cam surface defined by the inclined guide surface 5a and the inclined support surface 15a, respectively. As can be seen in FIG. 4, the guide track formed between the first cam surface and the second cam surface is sloping or inclined relative to a cross-sectional plane.

Figure 5A:
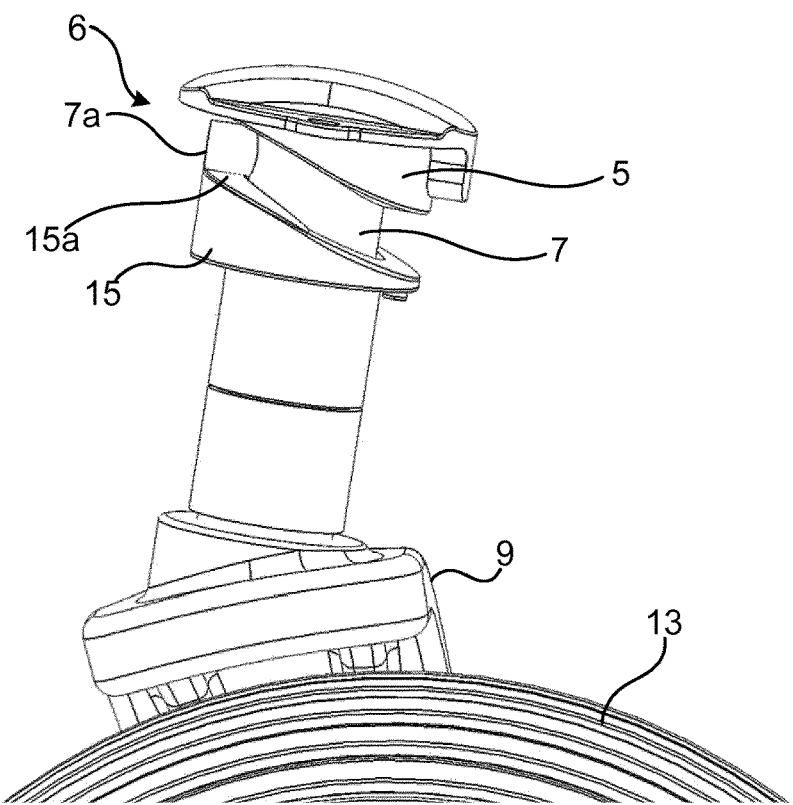
FIG. 5a shows the caster wheel assembly in a first state.
Figure 5B:
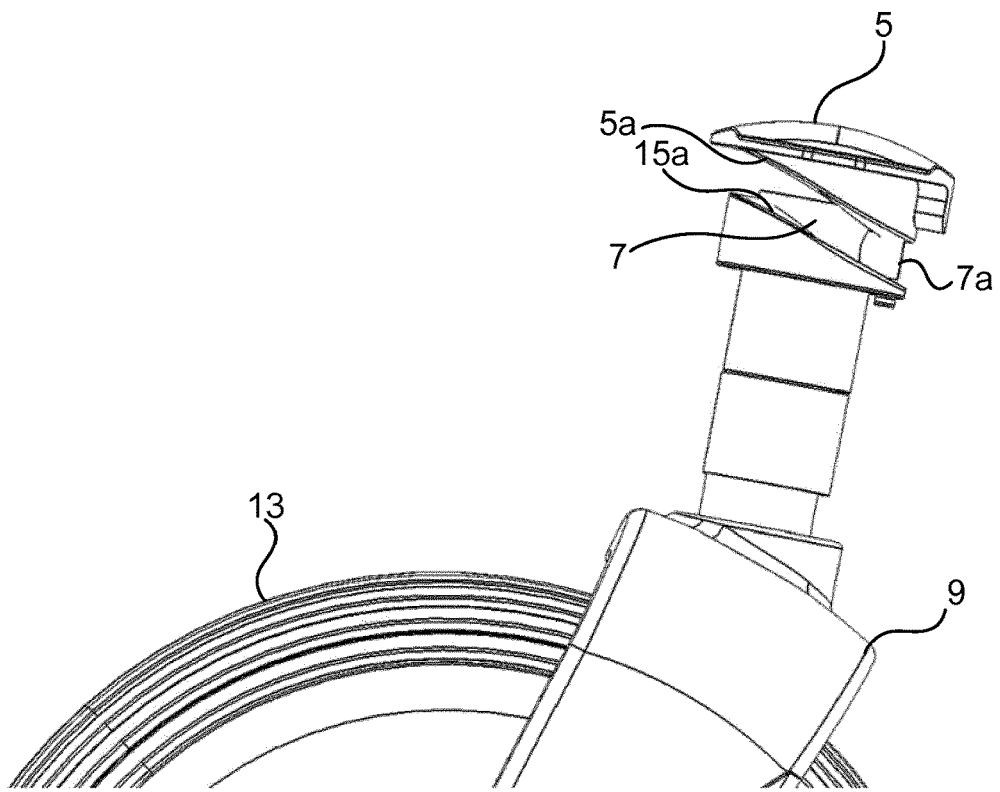
FIG. 5b depicts the caster wheel assembly in a second state compared to the first state, thereby providing a height compensation when the caster wheel assembly is mounted to the chassis of a wheelchair.

With reference to FIGS. 5a and 5b, the operation of the caster wheel assembly 1 will be described in more detail. The caster housing 3 has been removed to expose the components contained therein, i.e. height adjustment mechanism 6, to better illustrate the height adjustment function.

It should be understood that, although not shown, an arm, for example a swing arm, connected to the chassis of a wheelchair may be connected to the caster housing 3. By means of the height adjustment mechanism 6, the arm will maintain its vertical position when the caster wheel fork 9 is rotated about the central axis A1.

In FIG. 5a the caster wheel fork 9 and the caster wheel 13 are in a first rotational position. The spindle shaft 7 is in this case also in a first rotational position relative to the caster housing 3. The spindle shaft 7 is oriented so that the guide protrusion 7a is located at the highest point, i.e. at the top, of the inclined guide surface 5a.

In FIG. 5b, the caster wheel fork 9 and the caster wheel 13 have been rotated relative to the situation shown in FIG. 5a, and are now in a second rotational position, at 180 degrees relative to the first rotational position. The spindle shaft 7, which rotates concurrently with the caster wheel fork 9 and the caster wheel 13 is in this case also in the second rotational position. Since the caster housing 3 and the first cam surface and the second cam surface and defined by the inclined guide surface 5a and the inclined support surface 15a, respectively, remain fixed due to the attachment of the caster housing 3 to the arm, the rotation of the spindle shaft 7 causes an axial displacement of the spindle shaft 7 relative to the caster housing 3. The guide protrusion 7a will in particular slide along the guide track formed by the two cam surfaces, from the highest position of the inclined guide surface 5a to a lowest point, i.e. at the bottom, of the inclined guide surface 5*a*. In this manner, rotation of the caster wheel 13 will not cause any vertical position change of the arm, and thus of the chassis.

The inclination of the guide track relative to the central axis A1 may be designed based on the size of the trail T of the caster wheel assembly 1.

According to the embodiment described above, the guide structure with the inclined guide surface has been exemplified by a separate guide member. It should be understood that the guide structure may alternatively be formed by an inner surface structure of the caster housing. In such a variation the guide member could be discarded with. To this end, the caster housing may have an inner surface which is provided with a shoulder extending in the circumferential direction inside the caster housing and which is inclined relative to the central axis of the spindle shaft. Alternatively, the guide protrusion could be integrated with the caster housing, extending radially inwards towards the spindle shaft, and the spindle shaft could be provided with the inclined guide surface configured to cooperate with the guide protrusion of the caster housing.

Furthermore, as previously noted, the caster housing may be configured to be fixedly attached to an arm, such as a swing arm, and the caster wheel fork may be configured to be attached to the spindle shaft which is configured to rotate freely inside the caster housing. Alternatively, the spindle shaft may be configured to be fixedly attached to the arm, and the caster wheel fork may be configured to be attached to the caster housing, which in turn may be configured to rotate freely relative to the spindle shaft and the arm to which the spindle shaft is to be connected.

Figure 6:
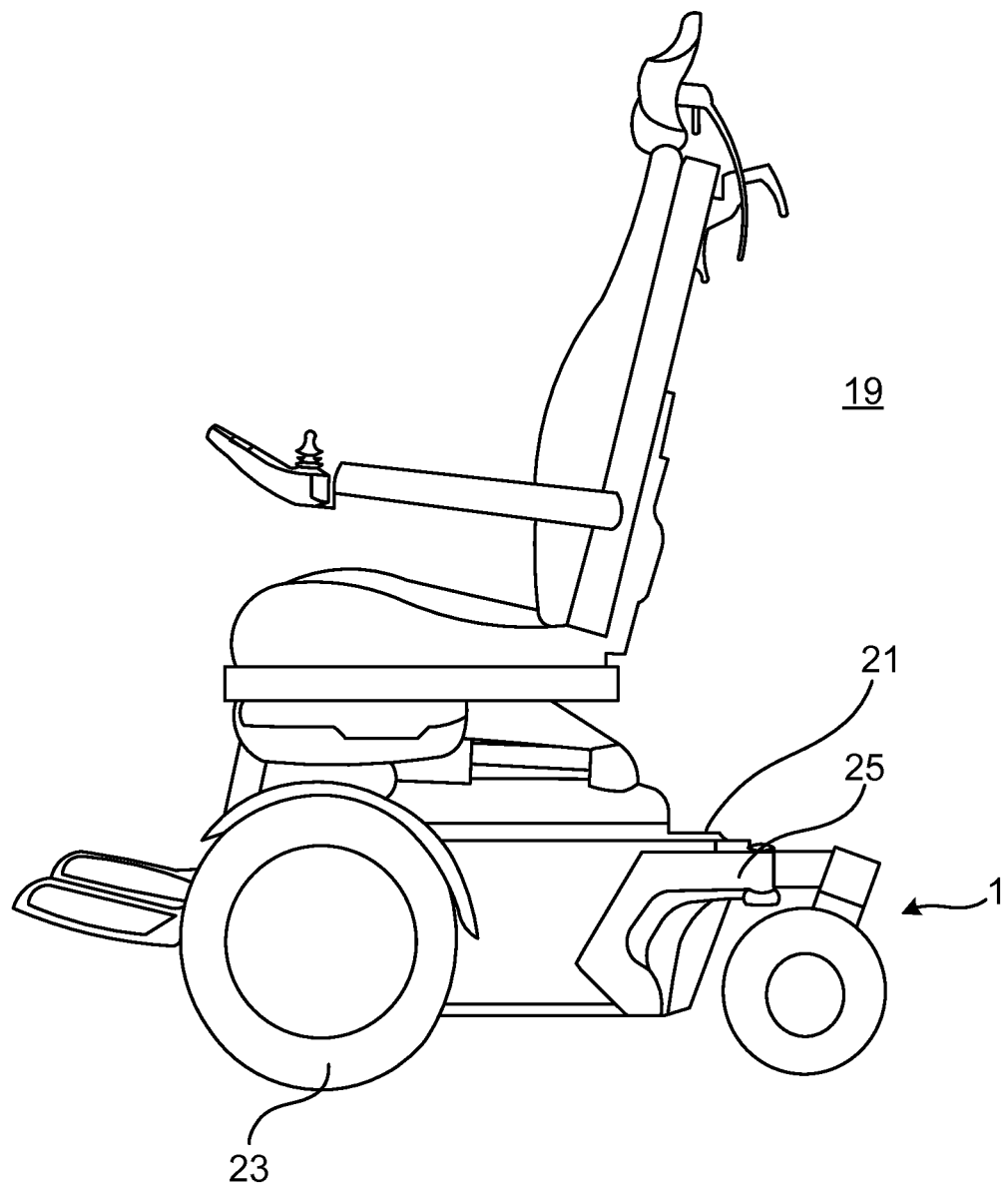
FIG. 6 schematically shows a side view of a wheelchair provided with the caster wheel assembly in FIG. 1.

FIG. 6 shows an example of a wheelchair 19. The wheelchair 19 may for example be an electrically powered wheelchair. The wheelchair 19 comprises a chassis 21, drive wheels 23, and caster wheel assemblies 1, each comprising a respective arm 25, for example a swing arm. Each caster wheel assembly 1 is connected to a respective arm 25.

In case of an electrically powered wheelchair, the wheelchair 19 may be any of a front wheel drive type wheelchair, a midwheel drive type wheelchair, rear wheel drive type, or any other type of drive configuration.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A caster wheel assembly, comprising:
a caster housing provided with an axial channel formed by an inside surface of the caster housing,
a spindle shaft comprising an outside surface, the spindle shaft received by the axial channel of the caster housing, which spindle shaft is inclined relative to a vertical plane when mounted in the caster housing and the caster wheel assembly is in use resting on a horizontal support,
the caster housing and the spindle shaft rotating freely relative to each other,
a caster wheel fork having a wheel axle arranged offset relative to a central axis of the spindle shaft, and
a height adjustment mechanism comprising:
an inclined guide surface extending circumferentially around the spindle shaft, the inclined guide surface provided on a guide member mounted to the caster housing, the inclined guide surface extending between the inside surface of the caster housing and the outside surface of the spindle shaft, and
a guide protrusion extending radially from a main body of the spindle shaft, wherein, when the spindle shaft is rotated while the caster wheel assembly is in use resting on the horizontal support, the guide protrusion and the inclined guide surface cooperate to adjust an axial position of the spindle shaft inside the caster housing.

2. The caster wheel assembly of claim 1, wherein:
the guide member comprising an opening that receives an end portion of the spindle shaft, and
the guide protrusion is a guide pin.

3. The caster wheel assembly of claim 2, wherein the guide member is axially fixed relative to the caster housing.

4. The caster wheel assembly of claim 3, wherein the guide member engages with the caster housing, to rotationally lock the guide member relative to the caster housing.

5. The caster wheel assembly of claim 1, wherein the inclination of the inclined guide surface is a function of the angled orientation of a distal end portion of the caster wheel fork, comprising the wheel axle, relative to the central axis of the spindle shaft.

6. The caster wheel assembly of claim 1, comprising:
a support member comprising:
a through-opening receiving the spindle shaft, and
an inclined support surface arranged axially displaced from and in parallel with the inclined guide surface, wherein:
the inclined support surface supports the guide protrusion,
the inclined guide surface and the inclined support surface form a guide track between them, and
the guide protrusion is arranged in the guide track, in contact with the inclined guide surface and the inclined support surface.

7. The caster wheel assembly of claim 6, wherein the caster housing has an inner flange surface axially supporting the support member and preventing axial movement of the support member.

8. The caster wheel assembly of claim 1, wherein the guide protrusion is arranged fixed in relation to a main body of the spindle shaft.

9. The caster wheel assembly of claim 1, comprising a swing arm coupled to the caster housing.

10. The caster wheel assembly of claim 2, wherein in a first rotational position of the spindle shaft, the guide protrusion is located at a highest point of the inclined guide surface of the guide member.

11. The caster wheel assembly of claim 10, wherein in a second rotational position of the spindle shaft, at 180 degrees relative to the first rotational position, the guide protrusion is located at a lowest point of the inclined guide surface.

12. A wheelchair comprising:
a chassis, and
a caster wheel assembly, comprising:
a caster housing provided with an axial channel formed by an inside surface of the caster housing,
a spindle shaft comprising an outside surface, the spindle shaft received by the axial channel of the caster housing, which spindle shaft is inclined relative to a vertical plane when mounted in the caster housing and the caster wheel assembly is in use resting on a horizontal support,
the caster housing and the spindle shaft rotating freely relative to each other, a caster wheel fork having a wheel axle arranged offset relative to a central axis of the spindle shaft, and a height adjustment mechanism comprising:

an inclined guide surface extending circumferentially around the spindle shaft, the inclined guide surface provided on a guide member mounted to the caster housing, the inclined guide surface extending between the inside surface of the caster housing and the outside surface of the spindle shaft, and a guide protrusion extending radially from a main body of the spindle shaft, wherein, when the spindle shaft is rotated while the caster wheel assembly is in use resting on the horizontal support, the guide protrusion and the inclined guide surface cooperate to adjust an axial position of the spindle shaft inside the caster housing, wherein the caster wheel assembly is pivotally coupled to the chassis.

13. The wheelchair of claim 12, wherein the wheelchair is an electrically powered wheelchair.

\* \* \* \* \*